J. DOWNEY & J. F. HAMILTON.
GOVERNOR.
APPLICATION FILED AUG. 16, 1909.
947,150.
Patented Jan. 18, 1910.
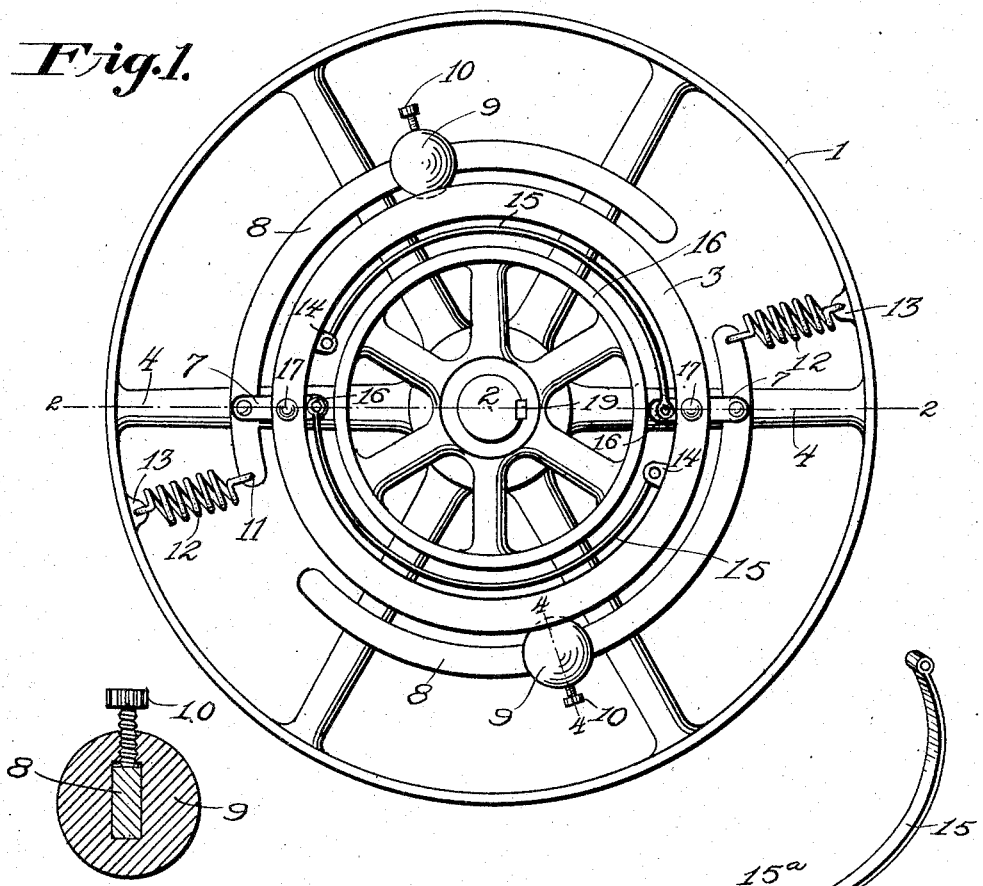
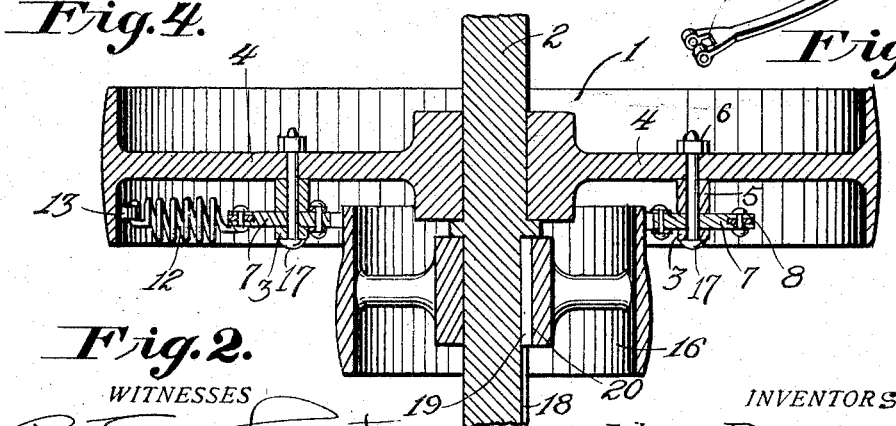
WITNESSES
INVENTORS,
John Downey,
John F. Hamilton,
Attorney.

UNITED STATES PATENT OFFICE.

JOHN DOWNEY AND JOHN F. HAMILTON, OF SEWARD, KANSAS.

GOVERNOR.

947,150.  Specification of Letters Patent.  Patented Jan. 18, 1910.

Application filed August 16, 1909. Serial No. 513,167.

*To all whom it may concern:*

Be it known that we, JOHN DOWNEY and JOHN F. HAMILTON, citizens of the United States, residing at Seward, in the county of Stafford and State of Kansas, have invented certain new and useful Improvements in Governors, of which the following is a specification, reference being had therein to the accompanying drawing.

This invention relates to governors and has for its object the production of a governor, which is simple in construction, efficient in operation and consists of a comparatively small number of parts.

Another object of this invention is the provision of means for facilitating the withdrawing of the clutch frames from the clutch wheel after the engine or balance wheel has returned to its original speed.

With these and other objects in view this invention consists of certain novel constructions, combinations and arrangements of parts, as will be hereinafter fully described and claimed.

In the drawings: Figure 1 is a side elevation of the clutch. Fig. 2 is a section taken on line 2—2 of Fig. 1. Fig. 3 is a detail perspective of one of the clutch bands. Fig. 4 is a section taken on line 4—4 of Fig. 1.

Referring to the drawings, by numerals 1 designates the band wheel over which is adapted to pass a belt adapted to impart movement thereto. The wheel 1 is loosely mounted upon a shaft 2 and a clutch frame 3 is carried by said wheel 1 and is separated from the spokes 4 by means of a collar 5 and the clutch frame 3 is secured to the spokes by means of bolts 6.

Pivotally secured to the clutch frame 3 are a plurality of lever members 7, which have fixedly secured at their outer end a clutch arm 8. The arm 8 partly surrounds the clutch frame 3 and has working upon the same a weight 9, which is held in a set position upon the arm 8 by means of a thumb screw 10. The weight 9 can be adjusted upon the arm 8, so as to regulate the outward swing of the same. The arm 8 is provided with a rearwardly-extending portion 11 to which is secured a coil spring 12, which coil spring is connected, at its outer end, to the band wheel 1 at 13. The spring 12 normally holds the arm 8 in an unoperative position. The frame 3 is also provided with a plurality of inwardly-extending lugs or ears 14 to which are secured the inner ends of the clutch band 15. The opposite ends of the clutch band 15 are secured to the inner portion of the lever 7, and it will be obvious that when the speed of the wheel 1 increases, the arms 8 will be thrown outwardly thereby, causing the clutch band 15 to be drawn against the clutch wheel 16. The levers 7 are pivotally mounted upon the clutch frame 3, at 17. The clutch wheel 16 is keyed to the shaft 2, and it will be obvious that when the clutch bands 15 engage said wheel that rotary movement will be imparted both to the wheel 16 and to the shaft 2. The shaft 2 is provided with a longitudinally-extending groove 18 in which fits a key 19, which also registers with a slot 20 formed in the wheel 16, thereby firmly locking the wheel 16 in engagement with the shaft 2.

From the foregoing description, it will be seen that when the wheel 1 increases in speed the arms 8 will be thrown outwardly, which will cause the inner ends 11 of the arms 8 to be drawn inwardly and thus cause the clutch band 15 to engage the wheel 16. When the centrifugal effect of the weights decreases sufficiently the coil springs 12 will readily bring the arms 8 to their original position.

The clutch band 15 is pivotally secured between the ears 14 of the clutch frame 3 and the clutch band 15 is provided with a bifurcated end 15$^a$, which straddles the inner end of the lever 7 and a pin 16$^a$ passes through said bifurcated end of the clutch band 15 and through the lever, and secures the same together.

What we claim is:—

1. In a device of the class described, the combination with a shaft, of a band wheel loosely mounted thereon, a clutch wheel fixedly secured to said shaft, a clutch frame carried by said band wheel, a plurality of levers pivotally mounted on said clutch frame, a plurality of clutch arms, each fixedly secured to the outer end of one of said levers, an adjustable weight on each of said clutch arms, each arm having a rear end extending beyond the said lever, a coil spring connecting the rear extending end of each clutch arm with the band wheel, and holding the weighted arm in an inoperative position, said clutch frame being provided with a plurality of ears, and clutch bands each having one end secured to said ears, and the other end to one of said levers and movable into engagement with the clutch wheel to impart rotary movement thereto when the weighted arms are thrown outward by centrifugal force.

2. In a device of the class described the combination with a shaft, of a band wheel loosely mounted thereon, a clutch wheel fixedly secured to said shaft, a clutch frame carried by said band wheel, a plurality of clutch arms carried by said frame and pivotally secured thereto, means engaging said arms for normally holding the same in an inoperative position, said arms adapted to be thrown into an extended position when the speed of the band wheel increases, clutch bands secured to said frame and said arms and adapted to be brought into engagement with said clutch wheel for imparting rotary movement thereto when the speed of the band wheel increases.

In testimony whereof we hereunto affix our signatures in presence of two witnesses.

JOHN DOWNEY.
JOHN F. HAMILTON.

Witnesses:
ED. McGINTY,
ELEONORA SCHMID.